(12) United States Patent
Dumitras

(10) Patent No.: US 11,175,674 B2
(45) Date of Patent: Nov. 16, 2021

(54) SYSTEMS AND METHODS FOR ROBOTIC GARBAGE CONTAINER DELIVERY

(71) Applicant: Alan Dumitras, Douglasville, GA (US)

(72) Inventor: Alan Dumitras, Douglasville, GA (US)

(73) Assignee: Alan Dumitras, Douglasville, GA (US)

( * ) Notice: Subject to any disclaimer, the term of this patent is extended or adjusted under 35 U.S.C. 154(b) by 0 days.

(21) Appl. No.: 16/670,208

(22) Filed: Oct. 31, 2019

(65) Prior Publication Data

US 2020/0064853 A1 Feb. 27, 2020

Related U.S. Application Data

(63) Continuation of application No. 15/378,459, filed on Dec. 14, 2016, now Pat. No. 10,481,607.

(51) Int. Cl.
| | |
|---|---|
| *B25J 11/00* | (2006.01) |
| *G05D 1/02* | (2020.01) |
| *B25J 9/16* | (2006.01) |
| *G01G 19/52* | (2006.01) |
| *B65F 1/00* | (2006.01) |
| *B65F 1/14* | (2006.01) |

(52) U.S. Cl.
CPC .......... *G05D 1/0225* (2013.01); *B25J 9/1664* (2013.01); *B25J 9/1676* (2013.01); *B65F 1/00* (2013.01); *B65F 1/1468* (2013.01); *G01G 19/52* (2013.01); *B65F 2210/128* (2013.01); *B65F 2210/1443* (2013.01); *B65F 2210/168* (2013.01)

(58) Field of Classification Search
CPC ........ B25J 9/1664; B25J 9/162; B25J 9/1676; B25J 9/1697; G01G 19/52; G05B 2219/2642; G05B 2219/31277; G05D 1/00; G05D 1/0214; G05D 1/0225; Y10S 901/01
USPC ........ 700/258; 180/65.1, 167, 168; 318/580, 318/587
See application file for complete search history.

(56) References Cited

U.S. PATENT DOCUMENTS

| | | | |
|---|---|---|---|
| 8,146,695 B1* | 4/2012 | Ramshur | B62D 1/283 180/168 |
| 9,801,517 B2* | 10/2017 | High | G06Q 10/0631 |
| 2005/0131645 A1* | 6/2005 | Panopoulos | G05D 1/0244 701/472 |
| 2005/0281653 A1* | 12/2005 | Channel | B62B 5/0026 414/498 |
| 2008/0120187 A1* | 5/2008 | Wesley | B62B 3/02 705/15 |

* cited by examiner

*Primary Examiner* — Dalena Tran
(74) *Attorney, Agent, or Firm* — Morris, Manning & Martin, LLP; Daniel E. Sineway; Adam J. Thompson

(57) ABSTRACT

A robotic drive system can be attached to a garbage container. A computing device can be configured to determine a travel path for the robotic drive system to travel to a location designated for garbage pickup. The computing device can be configured to cause the robotic drive system to move to be proximate to a location designated for garbage pickup.

20 Claims, 8 Drawing Sheets

SYSTEMS AND METHODS FOR ROBOTIC GARBAGE CONTAINER DELIVERY

CROSS REFERENCE TO RELATED APPLICATIONS

This application is a continuation of, and claims the benefit of and priority to, U.S. patent application Ser. No. 15/378,459, filed Dec. 14, 2016, and entitled "SYSTEMS AND METHODS FOR ROBOTIC GARBAGE CONTAINER DELIVERY," which is incorporated herein by reference in its entirety.

BACKGROUND

Garbage is collected in receptacles inside of homes. The garbage can be placed into a bag, and when the bag is full, the bag can be placed into a garbage container. On a scheduled frequency, people walk garbage containers to the street and leave the garbage containers at the street for pickup. The garbage containers are often left at night for pickup the next day. A garbage service schedules employees to pick up garbage containers on a scheduled route with a garbage truck. The employees empty the contents of the garbage containers into the garbage truck and leave the empty garbage container on the side of the road. Once empty, people pull the empty garbage containers back into their home or garage until the next scheduled delivery.

Garbage containers can be sold at stores, such as, for example, WALMART® or TARGET®. Garbage containers can have wheels on one side that allow a user to tip the garbage container to rest on the wheels for easy transport. The garbage containers can have lids to prevent debris or animals from getting into the garbage. The garbage containers can be made of a hard plastic and with metal parts to hold the wheels and to create the hinge for a lid.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

These and other aspects, objects, features, and embodiments will become apparent to a person of ordinary skill in the art upon consideration of the following detailed description of illustrative embodiments exemplifying the best mode as presently perceived.

A robotic system, referred to herein as a robotic garbage unit, can drive a garbage container from the side of a home or inside a garage to a curbside location for pickup by a garbage truck on a scheduled frequency. The robotic system can detect that garbage was removed from the garbage container and return the garbage container to the home for storage. The robotic system can engage a docking station to receive power when the robotic system is not in use. When an obstruction is encountered, the robotic system can change a travel path to avoid the obstruction when possible.

The robotic system can include proximity sensors, positioning sensors, garbage sensors, and other sensors. To monitor and control the robotic system, a computing device can be included on the robotic system. The computing device can be communicably coupled to the sensors and drive system. The computing device can run applications to perform various functionalities. As an example, an application can generate a travel path from a docking station to a garbage pickup location, and vice versa. The application can detect obstructions and monitor the obstructions while adjusting the travel path to avoid the obstructions.

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" does not suggest that all embodiments must include the referenced feature(s).

Figure 1:
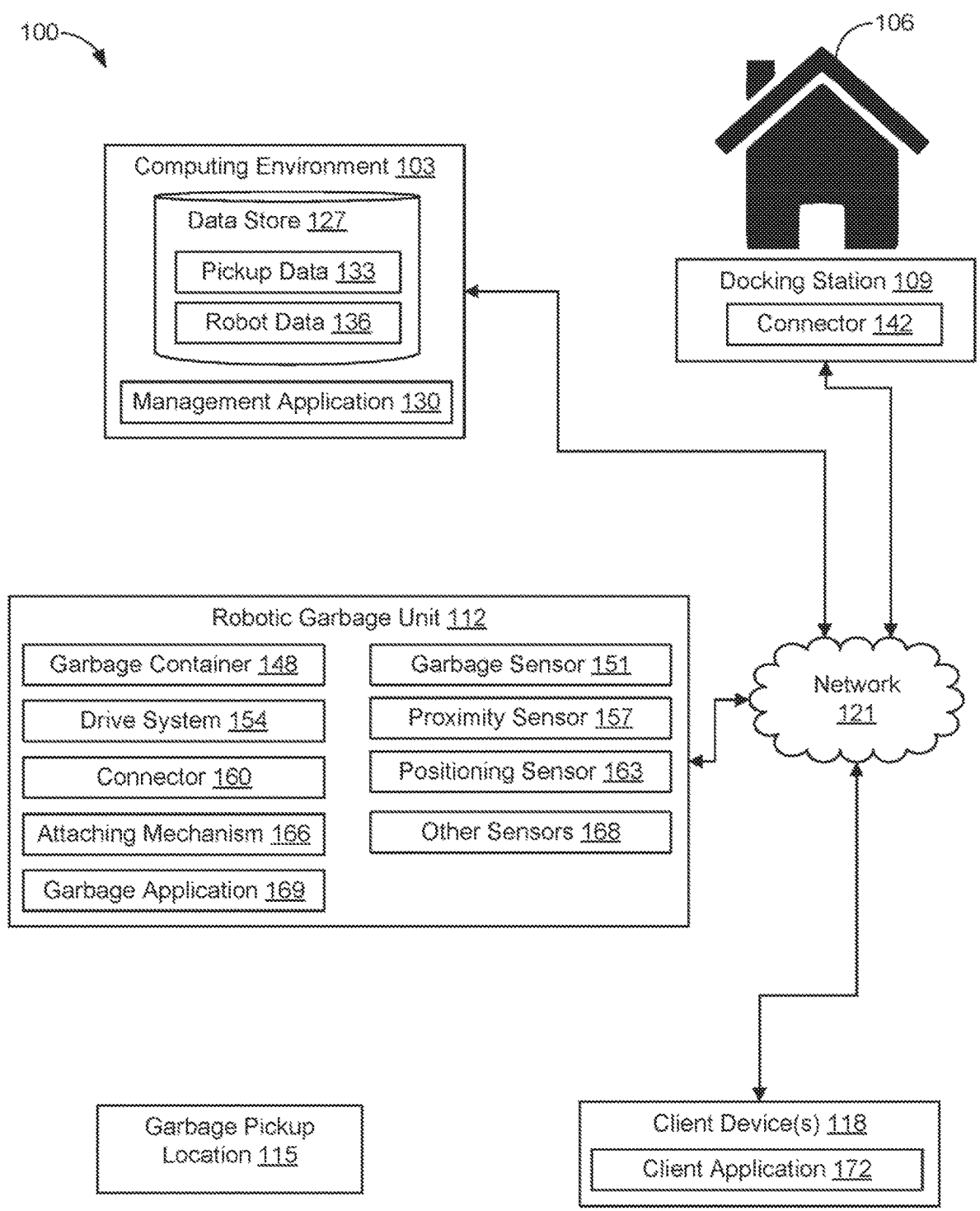
FIG. 1 is a drawing of a garbage removal environment according to various embodiments of the present disclosure.

Turning now to the drawings, exemplary embodiments are described in detail. With reference to FIG. 1, shown is a garbage removal environment 100 according to various embodiments. The garbage removal environment 100 includes a computing environment 103, a building structure 106, a docking station 109, a robotic garbage unit 112, a pickup garbage location 115, and a client device 118, which can be in data communication with each other via a network 121. The computing environment 103 includes a data store 127 and a management application 130. The data store 127 can store pickup data 133, robot data 136, and various other data. The docking station 109 can include a connector 142 to be used when docking a robotic garbage unit 112.

The components executed on the computing environment 103, robotic garbage unit 112, and/or client device 118, for example, can include a management application 130, a garbage application 169, a client application 172, and other applications, services, processes, systems, engines, or functionality not discussed in detail herein.

The robotic garbage unit 112 can include various components, such as, for example, a garbage container 148, a garbage sensor 151, a drive system 154, a proximity sensor 157, a connector 160, other sensors 168, an attaching mechanism 166, and a garbage application 169, among other components. A client device 118 can include a client application 172 to view, edit, and control features and functionality of the robotic garbage unit 112 by sending and receiving messages with the management application 130 through the network 121.

The robotic garbage unit 112 can transport garbage in the garbage container 148 from the docking station 109 to the garbage pickup location 115 in time for a scheduled pickup. For example, the robotic garbage unit 112 can disengage from the docking station 109 the night before a scheduled pickup and navigate from the docking station 109 to the garbage pickup location 115.

The garbage pickup location 115 can be identified during setup as a specific GPS location or relative location from the docking station 109. In some embodiments, the garbage pickup location 115 is identified by an electronic beacon device. The beacon device can be temporarily placed at the location during install or permanently installed at the garbage pickup location 115. The garbage pickup location 115 can also be defined by geographic features. For example, the garbage pickup location 115 can be defined as the side of the end of a driveway, such as, for example, three feet to the left of the driveway against a curb.

Once at the garbage pickup location 115, the robotic garbage unit 112 can wait until a garbage pickup event occurs when garbage is removed from the garbage container 148, which can be determined based on the garbage sensor 151. After the garbage pickup event occurs, the robotic garbage unit 112 can navigate back to the docking station 109 and engage the connector 160 with the connector 142 to begin charging until another scheduled pickup event.

The garbage container 148 can be a container with an opening on top. The garbage container 148 can include a bottom and four sides. The opening on top can be covered by a lid, which can be permanently attached to the garbage container 148 or removable. The garbage container 148 can have a specific volume for which to store garbage. In some embodiments, the garbage container 148 can be store 20 gallons of garbage, while in other embodiments, the garbage container 148 can store 70 gallons of garbage. In yet other embodiments, the volume of garbage can be another amount, such as, for example, 50 gallons of garbage. The garbage container 148 can be permanently affixed to the robotic garbage unit. Alternatively, the garbage container 148 can be attached by an attaching mechanism 166, which is discussed further below.

The garbage container 148 can include a garbage sensor 151 to detect whether or not garbage is stored in the garbage container 148. In some embodiments, the garbage sensor 151 detects whether the garbage container 148 contains more than a threshold quantity of garbage or not. As an example, the garbage sensor 151 can detect whether the garbage container 148 is 50% full or greater.

In another embodiment, the garbage sensor 151 can measure a substantive value corresponding to an amount of garbage in the garbage container 151. The substantive valve can correspond to a quantitative measurement of an amount of garbage in the garbage container. As an example, the garbage sensor 151 can measure the distance from the lid to the start of the garbage in the garbage container 148, such that the garbage sensor 151 returns a larger value when the garbage container 148 is empty and a smaller value when the garbage container 148 is full. As another example, the garbage sensor 151 can measure a weight of garbage in the garbage container 148.

The garbage sensor 151 can be a proximity sensor 157 configured to detect a proximity of garbage to an upper portion of the garbage container 148 or detect an amount of garbage based on some other parameter, such as inductance or capacitance. The garbage sensor 151 can be a load sensor positioned on a base of the drive system 154 that measures a current load provided by the garbage container 148.

The drive system 154 can include a drive mechanism, such as two or more wheels or one or more continuous tracks. The drive mechanism can control the direction and velocity of the robotic garbage unit 112. The drive mechanism can include one or more drive motors. The drive system 154 can include one or more motor controls to drive the drive mechanism, one or more braking devices to reduce speed while traveling, and a battery that provides power to the robotic garbage unit 112. The battery can be charged when the robotic garbage unit 112 is connected to the docking station, such as, for example, via connectors 142 and 160, or can be charged using another charger.

The drive system 154 can include one or more leveling mechanisms. As an example, a leveling mechanism can include a piston that tilts the garbage container 148. When driving on a slopped surface, as detected by a sensor, the garbage application 169 can tilt the garbage container 148 with the leveling mechanism to maintain a center of gravity on the horizontal plane in a center of the robotic garbage unit 112. The garbage container 148 can cause a rotational force when driving on a sloped surface. The rotational force can cause the robotic garbage unit 112 to tip over if the slope of the surface and weight of the garbage container 148 are not properly accounted for. In one embodiment, the drive system 154 can cause the garbage container to be substantially parallel to the gravitational force regardless of the slope of the surface being traversed.

The proximity sensor 157 can include one or more sensors that sense objects proximate to the robotic garbage unit 112. In some embodiments, multiple proximity sensors 157 are positioned on the robotic garbage unit 112 to read different planes of orientation around the robotic garbage unit 112, such as, for example, a first sensor oriented on the horizontal plane in a first direction, a second sensor facing 90 degrees relative to the first direction, a third sensor facing 180 degrees relative to the first direction and a fourth sensor facing 270 degrees relative to the first direction. The proximity sensors 157 can also be mounted in various orientations in the vertical plane.

The proximity sensors 157 can be communicably coupled to the garbage application 169. The garbage application 169 can read measurements from the proximity sensors 157 and use the resulting measurements to determine whether travel in a specific direction would result in a collision with another object. The proximity sensors 157 can be configured to sense a distance and direction of objects within a proximity to the robotic garbage unit 112. The proximity sensor 157 can be a camera, a capacitive sensor, a capacitive displacement sensor, a doppler effect sensor, an eddy-current sensor, an inductive sensor, a laser range finder, a magnetic sensor, a magnetic proximity fuse sensor, a passive optical sensor, a passive thermal infrared sensor, a photocell, a radar sensor, a sensor configured to measure reflection of ionizing radiation, a sonar sensor, an ultrasonic sensor, a fiber optics sensor, a hall effect sensor, a motion sensor, or other types of proximity sensors. The proximity sensor 157 can include an emitter when necessary, such as, for example, to emit radar or a laser to sense the reflection.

The positioning sensor 163 can include a global positioning system (GPS) receiver. The positioning sensor 163 can include circuitry to receive global positioning data and calculate a global positioning coordinate. The positioning sensor 163 can determine a position relative to the docking station 109. As an example, the positioning sensor 163 can determine a direction and signal strength of a wireless signal originating from the docking station 109. In some embodiments, the garbage application 169 can calculate the relative position of the docking station based on the GPS location of the docking station 109 and the GPS location of the robotic garbage unit 112 as determined via the positioning sensor 163.

The positioning sensor 163 can include a capacitive transducer, a capacitive displacement sensor, an eddy-current sensor, an ultrasonic sensor, a grating sensor, a hall effect sensor, an inductive non-contact position sensor, a laser doppler vibrometer, a linear variable differential transformer, a multi-axis displacement transducer, a photodiode array, a piezo-electric transducer, a potentiometer, a proximity sensor, a rotary encoder, a seismic displacement pickup, a string potentiometer, or other positioning sensor. The positioning can utilize external elements to determine positioning. For example, a guide can be installed in or on a concrete driveway for the positioning sensor 163 to locate. The guide can be a metal strip that can be sensed by a change in capacitance, inductance, or magnetic flux.

The connector 160 can include electrical connections configured to mate with connector 142 of the docking station 109. In some embodiments, a count of the electrical connections can be as few as two to supply power and ground. In other embodiments, the count of the electrical connections can be in the tens, hundreds, or thousands to facilitate fast data transfer. In one embodiment, the connectors 160/142 include twelve or thirteen electrical connections, with two or three being used to provide power and ground, and eight being mapped to a network cable. In yet another embodiment, eight electrical connections are used with all eight contacts being mapped to a network cable that supports power-over-Ethernet (PoE).

When connected to the docking station, therobotic garbage unit 112 can receive power from the docking station 109 through the electrical connections of mated connectors 160 and 142. In some embodiments, the robotic garbage unit 112 can communicate with network 121 through a wired connection facilitated by the electrical connections of mated connectors 160 and 142. For example, the garbage application 169 can store information about a pickup event while not docked to the docking station 109 and send the stored information to management application 130 when docked to the docking station 109 at a later time.

The garbage application 169 can read measurements from the garbage sensors 151, proximity sensors 157, positioning sensor 163, and other sensors 168. The garbage application 169 can instruct the drive system 154 to move the robotic garbage unit 112 by engaging a drive mechanism. For example, the garbage application 169 can instruct the drive system 154 to move forwards, backwards, and turn at a desired velocity as well as control other aspects of the drive system 154. The garbage application 169 can cause the robotic garbage unit 112 to drive from the docking station 109 to the garbage pickup location 115 and vice versa.

The garbage application 169 can cause the drive system 154 to transport the garbage container 148 to be proximate to the garbage pickup location 115. The garbage pickup location 115 can be designated for garbage pickup on a predefined frequency. The garbage application 169 can determine a location of the docking station 109. In some embodiments, the garbage application 169 can store the GPS location of the docking station 109 in internal storage on the robotic garbage unit 112, and determine the location of the docking station 109 by loading the GPS location from storage. In some embodiments, the garbage application 169 can determine the location of the docking station 109 by sending a wireless message to the docking station 109 and receiving a wireless response including the location.

The garbage application 169 can detect that an amount of garbage has been reduced, such as, for example, by reading the garbage sensor 151. The garbage application 169 can cause the drive system 154 to transport the garbage container 148 to be proximate to the docking station 109. In some embodiments, the robotic garbage unit 112 travels to the docking station 109 in response to detecting the amount of garbage has been reduced. The garbage application 169 can generate a travel path from the garbage pickup location 115 to the docking station 109, or vice versa. The garbage application 169 can instruct the drive system 154 to travel in the direction of the docking station 109 along the travel path while monitoring various sensors to ensure a collision does not occur.

The garbage application 169 can detect an obstruction along the travel path and modify the travel path to avoid the obstruction. For example, the garbage application 169 can monitor the proximity sensor 157 and the positioning sensor 163 while traveling, and change a course of travel based on detection of one or more objects. If an unobstructed travel path to either the docking station 109 or the pickup location 115 does not exist, the garbage application 169 can disable operation of the drive system 154.

The garbage application 169 can cause the drive system 154 to electrically couple with the docking station 109. The garbage application 169 can determine that the robotic drive system is proximate to the docking station 109. The garbage application 169 can initiate a docking sequence to electrically couple to the docking station 109. For example, the garbage application 169 can cause the drive system 154 to be positioned on a docking side of the docking station 109. The garbage application 169 can instruct the drive system 154 to align the connector 160 with the connector 142 of the docking station 109. The garbage application 169 can instruct the drive system 154 to move the coupling connector in a direction of the docking port in order to couple the connector 160 with the connector 142 of the docking station 109.

While docked to the docking station 109, the garbage application 169 can determine that a garbage pickup event is scheduled within a threshold period of time. For example, the garbage application 169 can determine that the garbage pickup event is scheduled in 12 hours. The garbage pickup event can be scheduled for an interval of time, such as, for example, during a 12 hour window. The garbage application 169 can determine that the start of a garbage pickup event window is scheduled within a threshold period of time. The garbage application 169 can undock from the docking station 109 in response to determining the garbage pickup event is scheduled within the threshold period of time.

The garbage application 169 can generate a travel path from the docking station 109 to the garbage pickup location 115 and cause the drive system 154 to travel along the travel path with the garbage container 148. The garbage application 169 can cause the robotic garbage unit 112 to be proximate to the garbage pickup location 115. The robotic garbage unit 112 can be proximate to a location when the robotic garbage unit 112 is within a threshold distance from the location, such as, for example, within six inches. For example, the garbage application 169 can cause the robotic garbage unit 112 to travel along the travel path until the distance to the garbage pickup location 115 is less than one inch or equal to from a current location.

In some embodiments, the garbage application 169 identifies the robotic garbage unit 112 as being at the garbage pickup location 115 when the robotic garbage unit 112 is within the threshold distance to the garbage pickup location 115 and further forward travel would move the robotic garbage unit 112 away from the garbage pickup location 115. In these embodiments, the robotic garbage unit 112 can minimize the distance to the garbage pickup location 115 without unnecessarily adjusting a position if the distance to the garbage pickup location 115 is within the threshold.

The robotic garbage unit 112 can also include a garage door opening circuit. If the docking station 109 is located within a garage, the garbage application 169 can open the garage door using the garage door opening circuit before traveling to the garbage pickup location 115. The garbage application 169 can close the garage door once the robotic garbage unit 112 has traversed passed the garage door opening. After the garbage pickup event, the garbage application 169 can similarly open and close the garage door while entering the garage to dock with the docking station 109.

The network 121 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. In one embodiment, the docking station 109 is connected to a network 121 through a wired connection, and the robotic garbage unit 112 is connected to network 121 through a wireless connection. The robotic garbage unit 112 can connect to the docking station 109 using a wireless signal, and the docking station 109 can bridge communications from the robotic garbage unit 112 to the network 121 and vice versa. For example, the docking station 109 can act as a repeater between the robotic garbage unit 112 and the network 121 by receiving and forwarding messages between these elements.

The computing environment 103 can include a data store 127 and a management application 130. The computing environment 103 can include, for example, a server computer or any other system providing computing capability. Alternatively, the computing environment 103 can employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 can correspond to an elastic computing resource where the allotted capacity of processing, network, storage, or other computing-related resources may vary over time.

Various applications and/or other functionality may be executed in the computing environment 103 according to various embodiments. Also, various data is stored in a data store 127 that is accessible to the computing environment 103. The data store 127 can be representative of a plurality of data stores 127 as can be appreciated. The data stored in the data store 127, for example, is associated with the operation of the various applications and/or functional entities described below.

The data stored in the data store 127 includes, for example, pickup data 133, robot data 136, and potentially other data. The pickup data 133 can include a list of previous pickup events and robot specific data from each pick up event. The data from the pickup events can include scheduled pick up time, actual pick up time, starting pick up location, ending pick up location. The robot specific data of the pickup data 133 can include a series of periodic sensor measurements with corresponding timestamps for the measurements during pick up event. For example, the robot specific data can include data from the garbage sensor 151, the proximity sensor 157, positioning sensor 163, and the other sensors 168. The data from the other sensors 168 can include accelerometer data, gyroscope data, digital compass data, barometer data, and various other sensor data. As such, the other sensors 168 can include an accelerometer, a gyroscope, a compass, a barometer, and other sensors.

The management application 130 can be executed to perform various functions, including retrieving and storing information in data store 127. For example, the management application 130 can receive information from the garbage application 169 about pickup events including sensor information over time during a garbage pickup event and travel information about obstructions encountered while traveling along a travel path. The management application 130 can notify the client application 172 if an obstruction is encountered. In one example, the management application 130 sends a notification to the client application 172 when an unobstructed travel path is unavailable and the robotic drive unit 112 has been disabled.

The client device 118 is representative of a plurality of client devices that can be coupled to the network 121. The client device 118 can include, for example, a processor-based system, such as a computer system, that can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 118 can include a display. The display can include, for example, one or more devices such as liquid crystal display (LCD) displays, gas plasma-based flat panel displays, organic light emitting diode (OLEO) displays, electrophoretic ink (E ink) displays, LCD projectors, or other types of display devices, etc.

The client device 118 can be configured to execute various applications such as a client application 172 and/or other applications. The client application 172 can be executed in a client device 118, for example, to access network content served up by the computing environment 103 and/or other servers, thereby rendering a user interface on the display. To this end, the client application 172 can comprise, for example, a browser, a dedicated application, etc., and the user interface can be from a network page, an application screen, etc. The client device 118 can be configured to execute applications beyond the client application 172 such as, for example, email applications, social networking applications, word processors, spreadsheets, and/or other applications.

The client application 172 can display the status of the robotic garbage unit 112 on a display of the client device 118. For example, the client application 172 can query the management application 130 for information about the robotic garbage unit 112, such as, for example, pickup data 133 and robot data 136.

The client application 172 can show a current location of the robotic garbage unit 112. In some embodiments, the robotic garbage unit 112 includes a cellular network connection to network 121. The client application 172 can query the robotic garbage unit 112 to receive a current GPS location of the robotic garbage unit 112. As an example, if the robotic garbage unit 112 is stolen, a user can use the client application 172 to determine the location of the robotic garbage unit 112. In one embodiment, the client application 172 communicates with the robotic garbage unit 112 through the management application 130.

An area can be defined for normal operation of the robotic garbage unit 112. In some embodiments, the area is defined by a user through the management application or the client application 172. In another embodiment, an area is automatically defined by the management application based on the location of the docking station 109 and the garbage pickup location 115. In this embodiment, the management application 130 can determine an optimal path between the docking station 109 and the garbage pickup location 115 and define that the robotic garbage unit 112 is within the area of normal operation when within a threshold distance from the optimal path. As an example, the robotic garbage unit 112 is outside of the area of normal operation if further than forty feet from any point on the optimal path.

If the robotic garbage unit 112 is outside of the area of normal operation, the management application 130 or the garbage application 169 can send a notification to the client application 172 indicating that the robotic garbage unit 112 has left the area. The notification can include a current location of the robotic garbage unit 112, one or more photographs or videos of the surroundings that lead to the movement outside of the area of normal operation, and a direction of travel. The garbage application 169 can disable operation of the robotic garbage unit 112 unless an enable command is received from a client application 172.

The client application 172 can display a history of garbage pickups including the times of each of the garbage pickups. The client application 172 can notify a user if a garbage pickup has not occurred during a scheduled pickup window. In some embodiments, the robotic garbage unit 112 can send a notification to a third-party garbage collection service via the internet indicating a missed pickup event. In this embodiment, the robotic garbage unit 112 can receive an updated scheduling window from the third-party garbage collection service.

The client application 172 can render a user interface including a live video stream of one or more onboard cameras received from the robotic garbage unit 112, such as from the proximity sensors 157. The user interface can include user interface elements to receive drive instructions. For example, the user interface can include a joystick to indicate a desired direction and velocity of travel. The client application 172 can send commands to the garbage application 169 to cause the drive system 154 to drive according to the joystick position. Accordingly, a user of the client device 118 can steer the robotic garbage unit 112 while watching a live feed from the robotic garbage unit 112.

The user interface can also include other elements illustrating the current measurements of the other sensors 151, 157, 163, and 168. For example, the user interface can show an overhead illustration of the robotic garbage unit 112 with color filled in where obstructions are detected, but color omitted where no obstructions are detected. These other elements can facilitate greater control and awareness during the driving experience for the user.

Figure 2A:
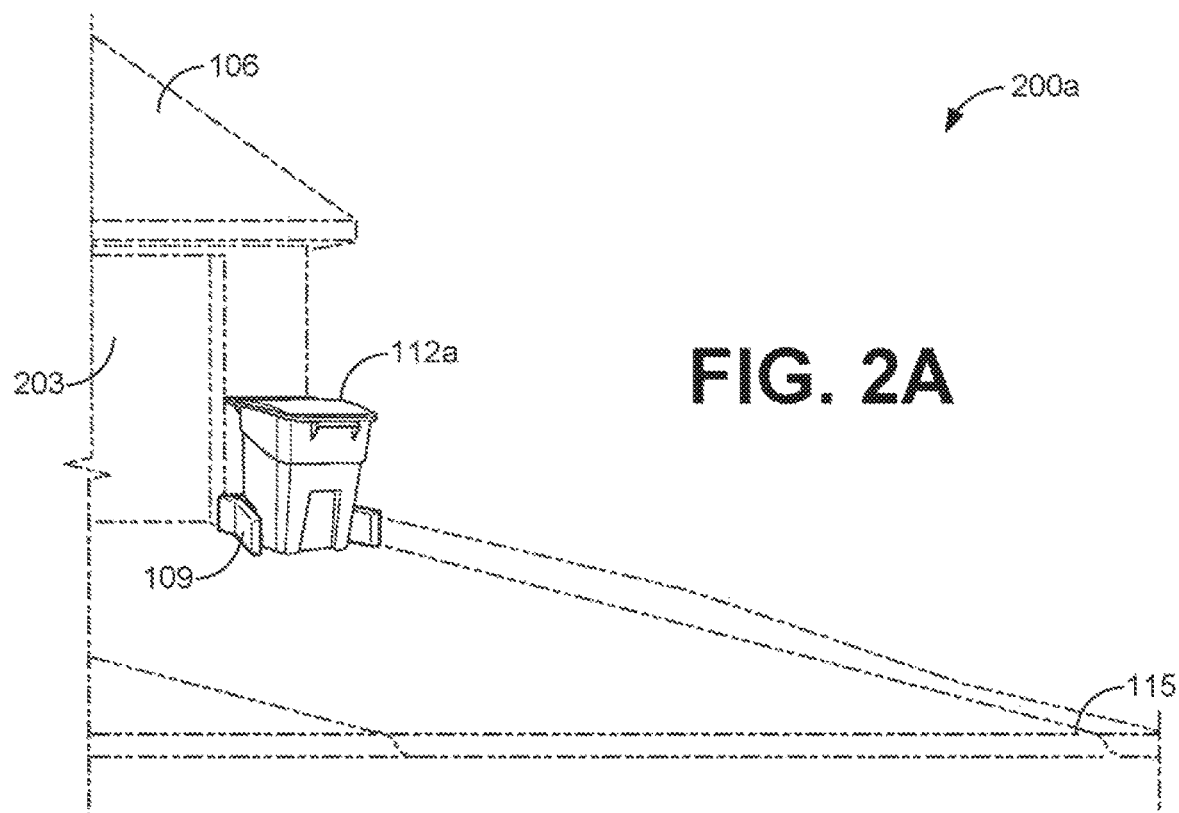
FIGS. 2A and 2B are illustrations of the garbage removal environment user interface of FIG. 1 according to various embodiments of the present disclosure.
Figure 2B:
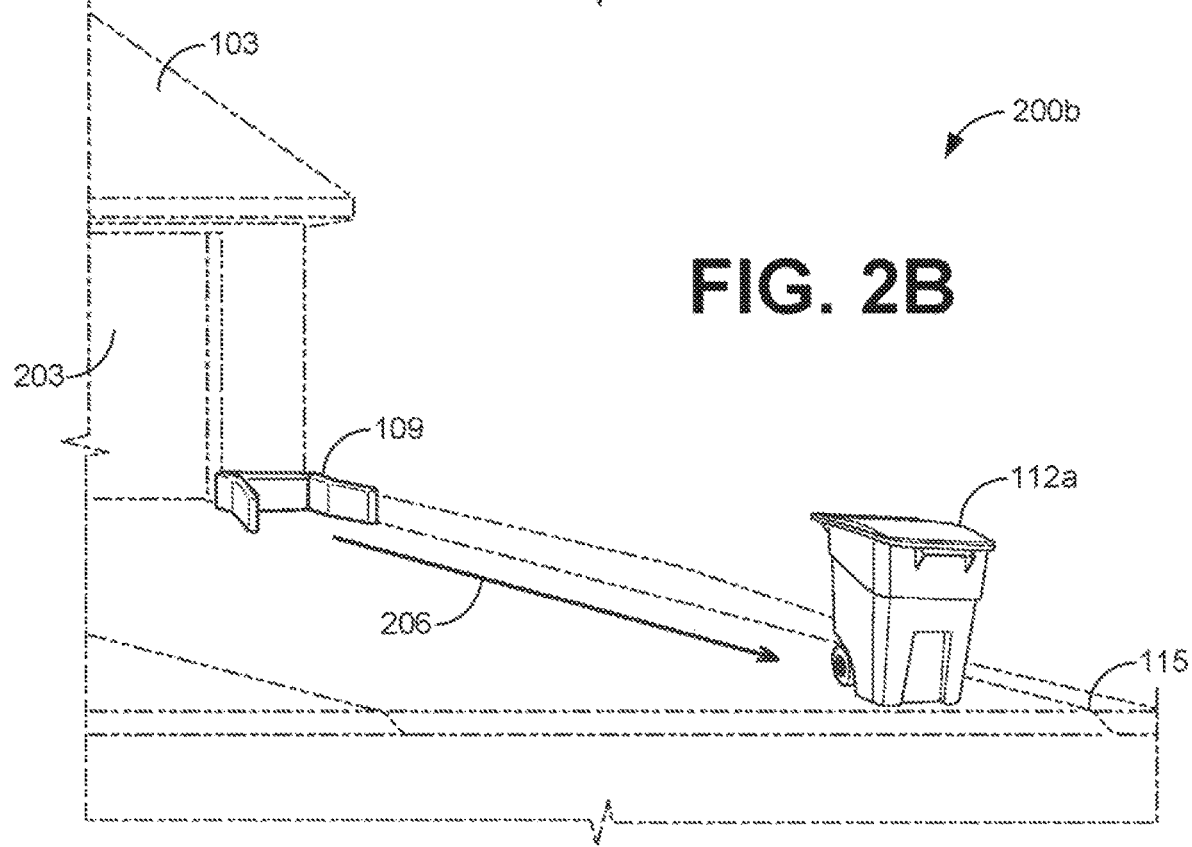

Turning to FIGS. 2A and 2B, shown are various examples of the garbage removal environment 100, shown as garbage removal environments 200a and 200b according to various embodiments of the present disclosure. The garbage removal environments 200a and 200b include a building structure 106, a docking station 109, a robotic garbage unit 112a, and a pickup location 115. In some embodiments, the building structure can have a garage door 203 and the docking station 109 can be positioned inside of the garage.

The garbage removal environment 200a illustrates the robotic garbage unit 112a docked to the docking station 109. While docked, the connector 160 of the robotic garbage unit 112a is engaged with the connector 142 of the docking station 109. The robotic garbage unit 112a can charge a battery and exchange data with the docking station 109 via the connection to the docking station 109.

As shown in the garbage removal environment 200b, the robotic garbage unit 112a can disengage from the docking station 109 and travel to the pickup location 115 by traversing a travel path 206. The garbage application 169 can calculate the travel path 206 and cause the robotic garbage unit 112a to disengage and travel along the travel path 206 to a location proximate to the pickup location 115. For example, when a pickup event is scheduled to occur, the garbage application 169 can initiate the process of traveling to the pickup location 115.

Figure 3A:
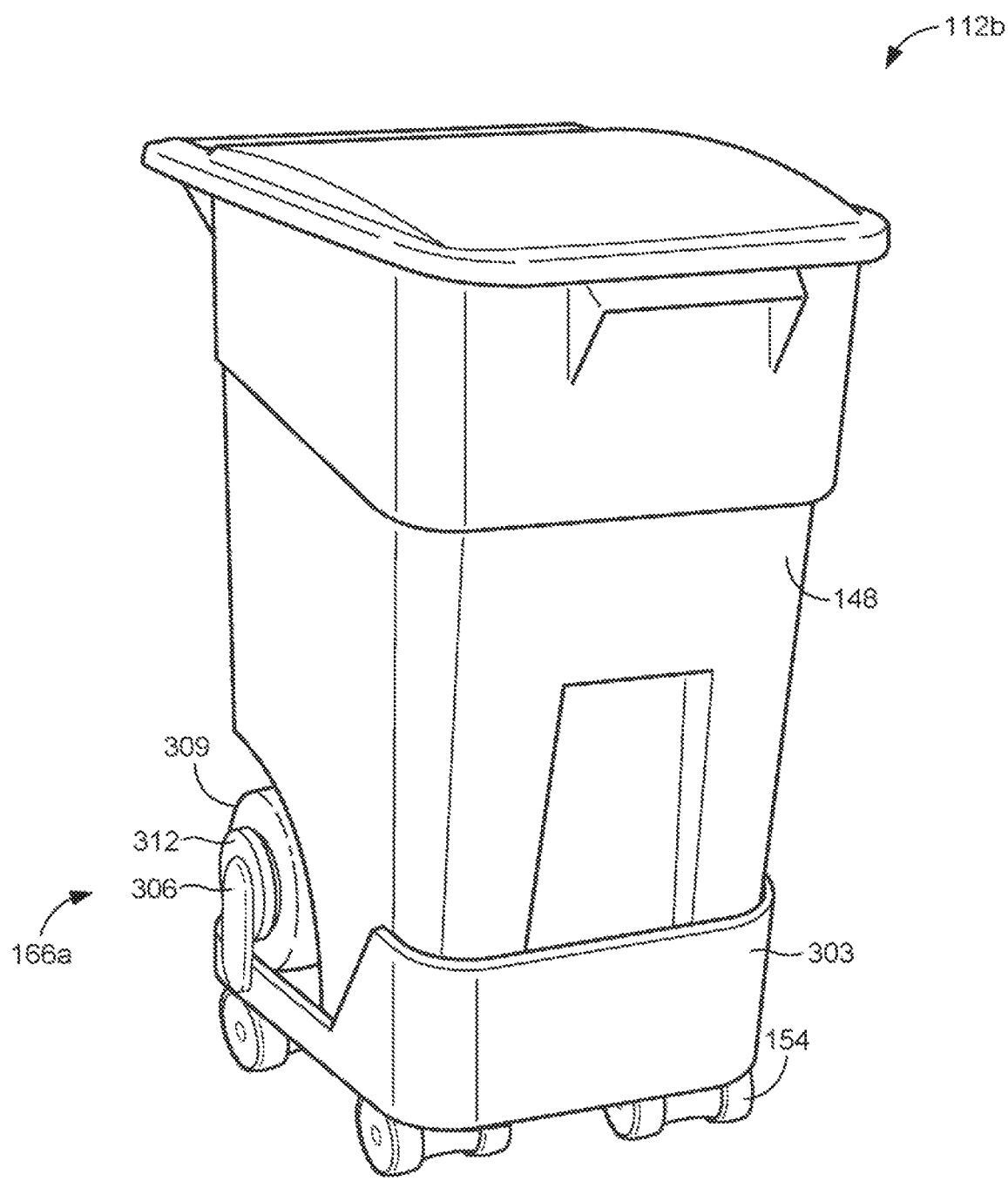
FIGS. 3A-3C are illustrations of robotic garbage units according to various embodiments of the present disclosure.
Figure 3B:
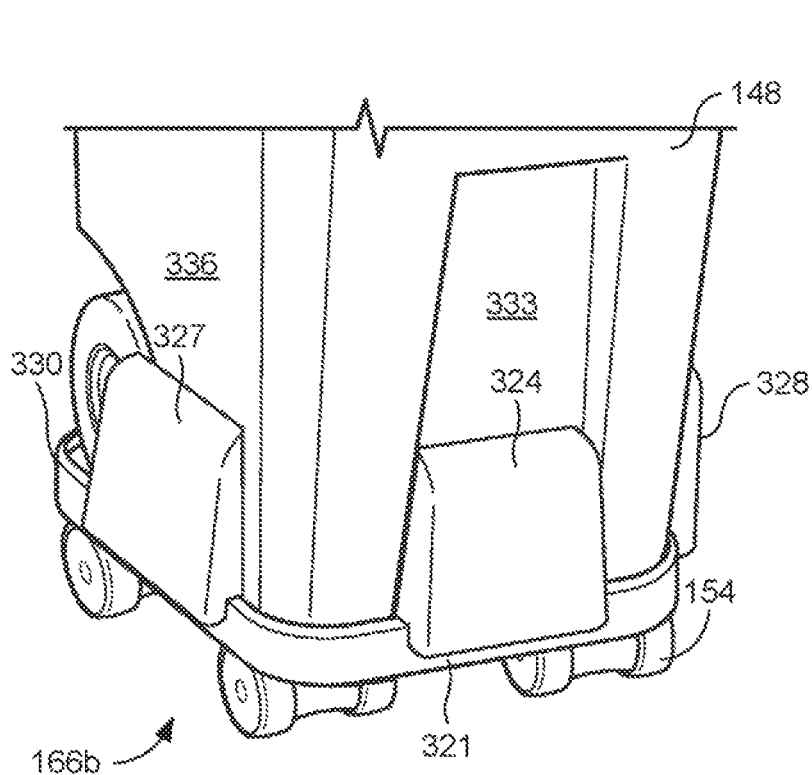
Figure 3C:
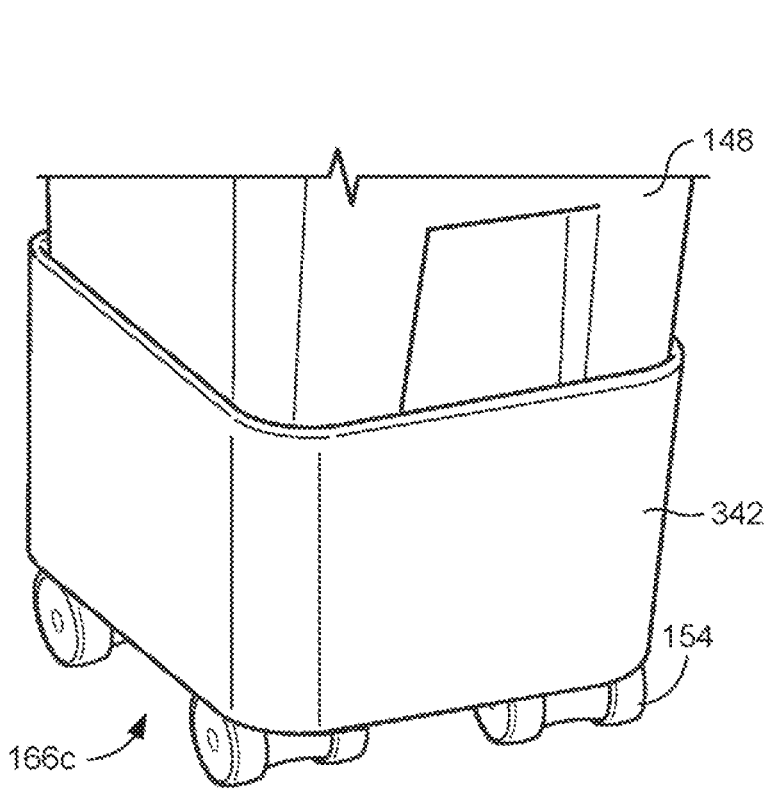

With reference to FIGS. 3A-C, shown are examples of a robotic garbage unit 112 according to various embodiments of the present disclosure. In some embodiments, garbage container 148 can be manufactured to facilitate attachment by the attaching mechanism 166 and can include sensors, such as a garbage sensor 151 and other sensors. In other embodiments, the garbage container 148 can be any garbage container 148 used for garbage collection. In other embodiments, the attaching mechanism is omitted and the garbage container 148 is permanently affixed to the drive system 154.

FIG. 3A illustrates an example attaching mechanism 166a for holding the garbage container 148 onto the drive system 154 of the robotic garbage unit 112b. The attaching mechanism 166a can include a front support portion 303 and a wheel clamp 306. A wheel 309 of the garbage container 148 can be clamped by the wheel clamp 306. The wheel clamp 306 can include a circular contact portion 312 that comes in contact with the wheel 309. In some embodiments, the wheel clamp 306 can include a spring mechanism to force the circular contact portion 312 into contact with the wheel 309. In some embodiments, the wheel clamp 306 is positioned and fixed in place by a restrictive clamp. The wheel clamp 306 can be fixed in place while a spring mechanism pushes the circular contact portion 312 into the wheel 309 to maintain a pressing force.

The circular contact portion 312 can be made of foam, rubber, metal, or other material. The material of the circular contact portion 312 can provide static friction against the wheel 309 to prevent movement of the wheel 309. In one embodiment, the wheel 309 has a rim and the circular contact portion 312 can include a cylindrical protrusion that enters into the rim of the wheel 309 to secure the wheel 309. The front support portion 303 can contact a front of the garbage container 148 to prevent the garbage container 148 from shifting forward. The height of the front support portion 303 can prevent the garbage container 148 from rotating backwards around the wheel 309.

FIG. 3B illustrates another example attaching mechanism 166b for holding the garbage container 148 onto the drive system 154 of the robotic garbage unit 112c. The attaching mechanism 166b can include a base 321 with a first clamping arm 324, a second clamping arm 327, and a third clamping arm 328. The base 321 can include a rim 330 that extends upward. The first clamping arm 324 can contact a first side 333 of the garbage container 148. In some embodiments, the first side 333 includes a recessed space in the shape of the first clamping arm 324. The recessed space can facilitate attachment by the attaching mechanism 166b. The second clamping arm 327 can contact the second side 336 of the garbage container 148. The third clamping arm 328 can contact a third side of the garbage container 148. Although not shown, the attaching mechanism 166b can also include a fourth clamping arm that contact a fourth side of the garbage container 148.

FIG. 3C illustrates another example attaching mechanism 166c for holding the garbage container 148 onto the drive system 154 of the robotic garbage unit 112d. The attaching mechanism 166c includes a rectangular bin 342 that the garbage container 148 fits into. The rectangular bin 342 can provide lateral and vertical support to the garbage container 148. The garbage container 148 can be lifted and placed into the rectangular bin 342.

Figure 4:
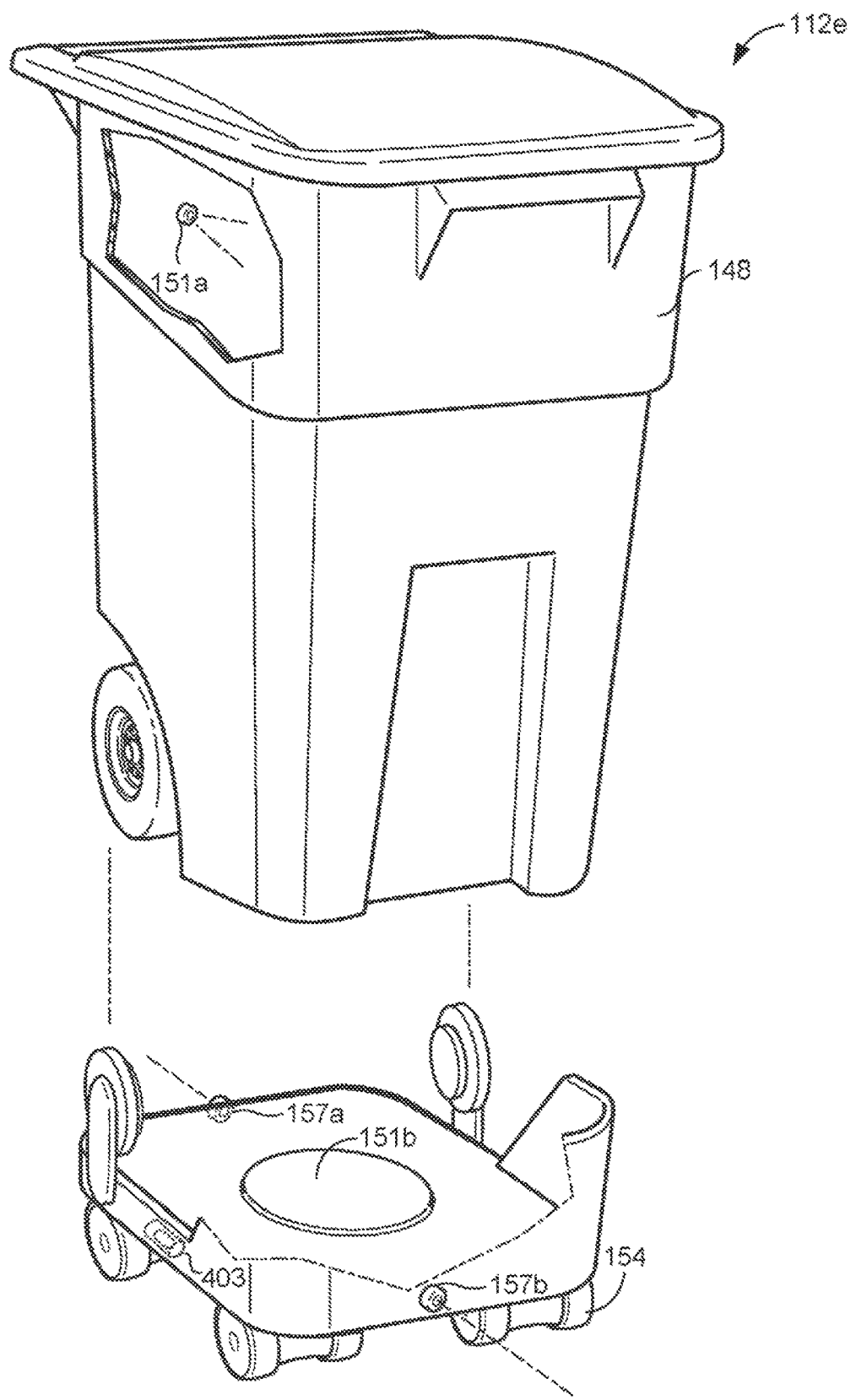
FIG. 4 is an illustration of a robotic garbage unit according to various embodiments of the present disclosure.

Turning to FIG. 4, shown is a robotic garbage unit 112e according to various embodiments of the present disclosure. The robotic garbage unit 112e illustrates one example of the placement of several sensors. The robotic garbage unit 112e can include a garbage sensor 151a affixed to the garbage container 148 and/or a garbage sensor 151b as part of the drive system 154. The robotic garbage unit 112e can include a first proximity sensor 157a facing toward a first side and a second proximity sensor 157b facing toward a second side. The robotic garbage unit 112e can also include one or more electronic components 403, such as, for example, a positioning sensor 163, other sensors 168, a computing device, and other circuits.

Figure 5:
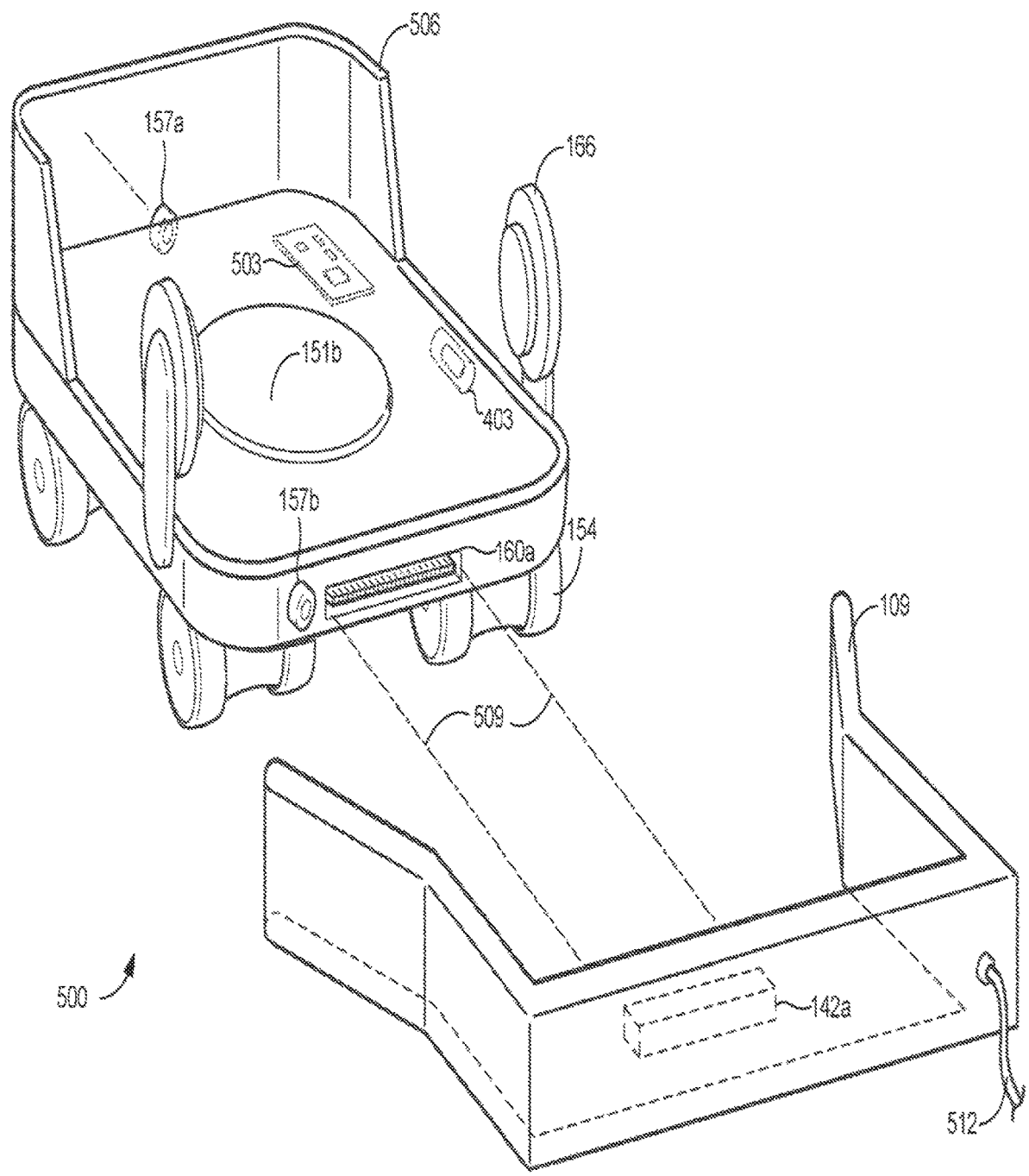
FIG. 5 is an illustration of a robotic garbage unit and docking station according to various embodiments of the present disclosure.

With reference to FIG. 5, shown is a base 500 of a robotic garbage unit 112 according to various embodiments of the present disclosure. The connector 160a on the base 500 can connect to the connector 142a on the docking station 109. Several pins on the connector 160a can mate with the pins on connector 142a to establish a communication bus between the base 500 and the docking station 109. The communication bus can include clock and data signals in addition to a power and ground single, among other electrical connections.

The base 500 can include a circuit board 503, which is shown separate from the electronic components 403. The circuit board 503 can include a computing device with a hardware processor and memory. The base 500 can also include a wireless antenna connected to the circuit board 503, such as along the ridge 506 of the base 500. The garbage application 169 executed in the computing device can cause the drive system 154 to align the base 500 with the docking station 109 and travel along the travel path 509 to connect the connectors 160a and 142a together. A cable 512 can provide power to the docking station 109. In some embodiments, the cable 512 is an AC power cable plugged into a wall outlet. The cable 512 can also include an Ethernet connection to a local area network. In one embodiment, the cable 512 is a network cable with PoE to provide power.

Figure 6:
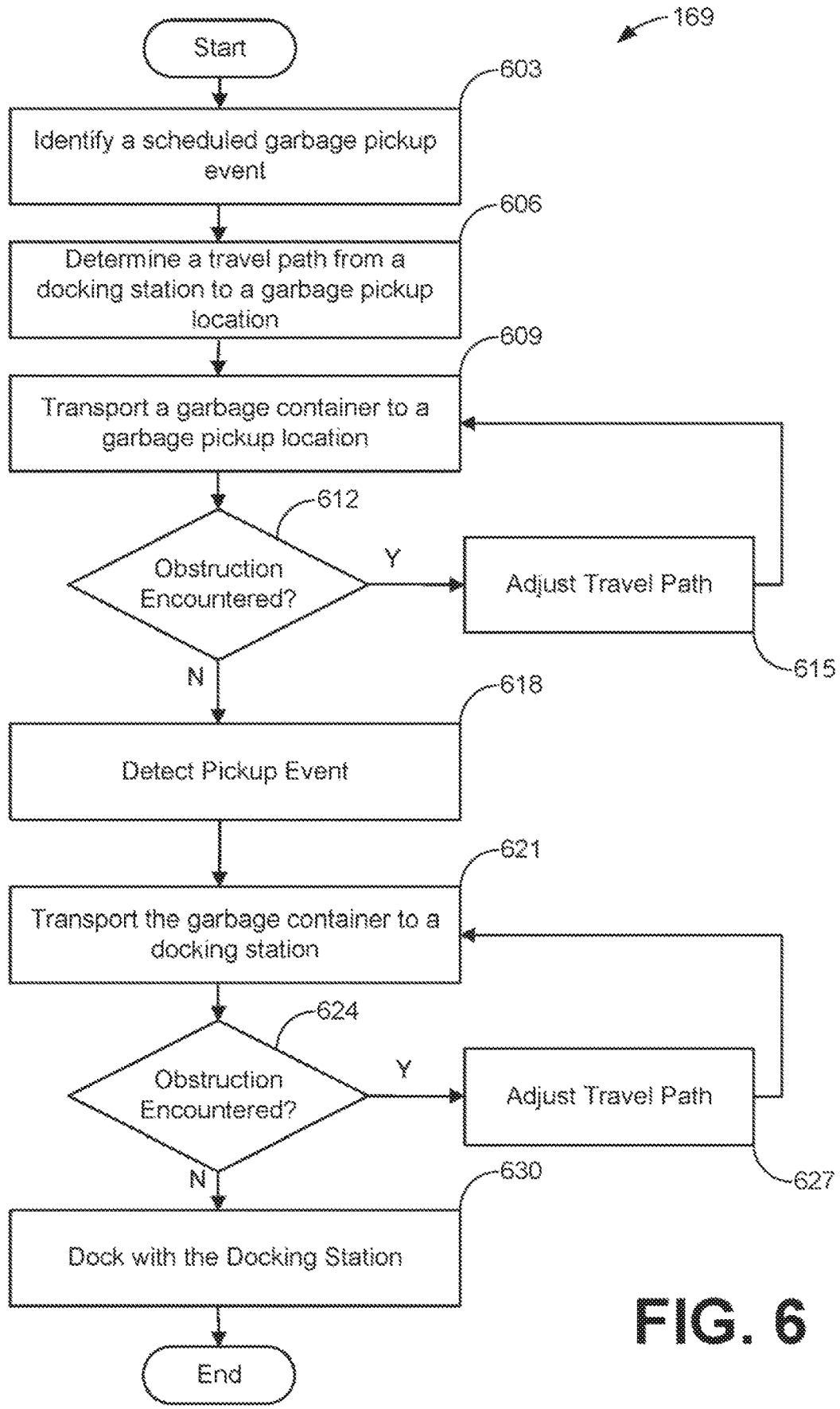
FIG. 6 is a flowchart of certain functionality implemented by portions of the garbage removal environment of FIG. 1 according to various embodiments of the present disclosure.

Referring next to FIG. 6, shown is a flowchart that provides one example of the operation of a portion of the garbage application 169 according to various embodiments. It is understood that the flowchart of FIG. 6 provides merely an example of the many different types of functional arrangements that may be employed to implement the operation of the portion of the garbage application 169 as described herein. As an alternative, the flowchart of FIG. 6 may be viewed as depicting an example of elements of a method implemented in robotic garbage unit 112 according to one or more embodiments.

Beginning with box 603, the garbage application 169 can identify a scheduled garbage pickup event. The garbage application 169 can determine that a current time is within a threshold period of time from the scheduled garbage pickup.

At box 606, the garbage application 169 can determine a travel path. The travel path can begin at the current location of the robotic garbage unit 112, such as the docking station 109, and end at the garbage pickup location 115. The travel path can be based in part on a history of travel paths taken. For example, the garbage application 169 can route the travel path to avoid a sunken spot in a concrete driveway based on sensor measurements during previous travel paths taken. As another example, the garbage application 169 can avoid passing near a previously detected obstruction in a previously used travel path.

At box 609, the garbage application 169 can transport the garbage container 148 along the travel path to the garbage pickup location. The garbage application 169 can cause the drive system 154 to disengage from the docking station and proceed to travel along the travel path.

At box 612, the garbage application 169 can monitor the sensors to determine if an obstruction is encountered while traveling on the travel path. The garbage application 169 can detect a change in elevation beyond a threshold level allowed. For example, the garbage application 169 can detect the ledge of a curb and determine the drop driving off the edge of the curb exceeds an allowed change in elevation. As such, the garbage application 169 can identify the curb as an obstruction. As another example, the garbage application 169 can detect a car parked in the driveway based on the proximity sensors 157. The garbage application 169 can identify the car as an obstruction. If an obstruction is encountered, the garbage application 169 can proceed to box 615. Otherwise, the garbage application 169 proceeds to box 618.

At box 615, the garbage application 169 can adjust the travel path to avoid the obstruction. The garbage application 169 can change direction to attempt to drive around the obstruction, while monitoring sensors to determine the shape and size of the obstruction. As an example, the garbage application 169 can follow an outer edge of the obstruction based on measurements from the proximity sensor 157. The robotic garbage unit 112 can stop when it arrives at the garbage pickup location 115 and wait for a garbage pickup event. If no travel path is unobstructed, the garbage application 169 can disable the robotic garbage unit 112 and send a notification to the management application 130, which can inform the user via the client device 118.

At box 618, the garbage application 169 can detect a garbage pickup event. For example, the garbage application 169 can receive a measurement from the garbage sensor 151 that identifies a change in the amount of garbage in the garbage container 148. The garbage application 169 can detect the garbage pickup based on other sensors 168, such as, for example, by measurements from an accelerometer and/or gyrosphere indicating the garbage container 148 has been turned upside down to remove garbage.

At box 621, the garbage application 169 can cause the robotic garbage unit 112 to transport the garbage container 148 back to the docking station 109. In the same or similar manner as described in boxes 606 and 609, the garbage application 169 can determine a travel path back to the docking station 109.

At box 624, the garbage application 169 can monitor the sensors to determine if an obstruction is encountered while traveling on the travel path from box 621. The garbage application 169 can detect a change in elevation beyond a threshold level allowed. For example, the garbage application 169 can detect the ledge of a curb and determine the drop driving off the edge of the curb exceeds an allowed change in elevation. As such, the garbage application 169 can identify the curb as an obstruction. As another example, the garbage application 169 can detect a car parked in the driveway based on the proximity sensors 157. The garbage application 169 can identify the car as an obstruction. If an obstruction is encountered, the garbage application 169 can proceed to box 627. If an unobstructed path is unavailable, the garbage application 169 can disable the robotic garbage unit 112 and transmit a notification to a user. Otherwise, the garbage application 169 proceeds to box 630.

At box 627, the garbage application 169 can adjust the travel path in the same or similar way as in box 615.

At box 630, the garbage application 169 can initiate a docking sequence with the docking station 109. The garbage application 169 can cause the drive system 154 to align with the docking station 109 and engage connector 160 with connector 142.

Figure 7:
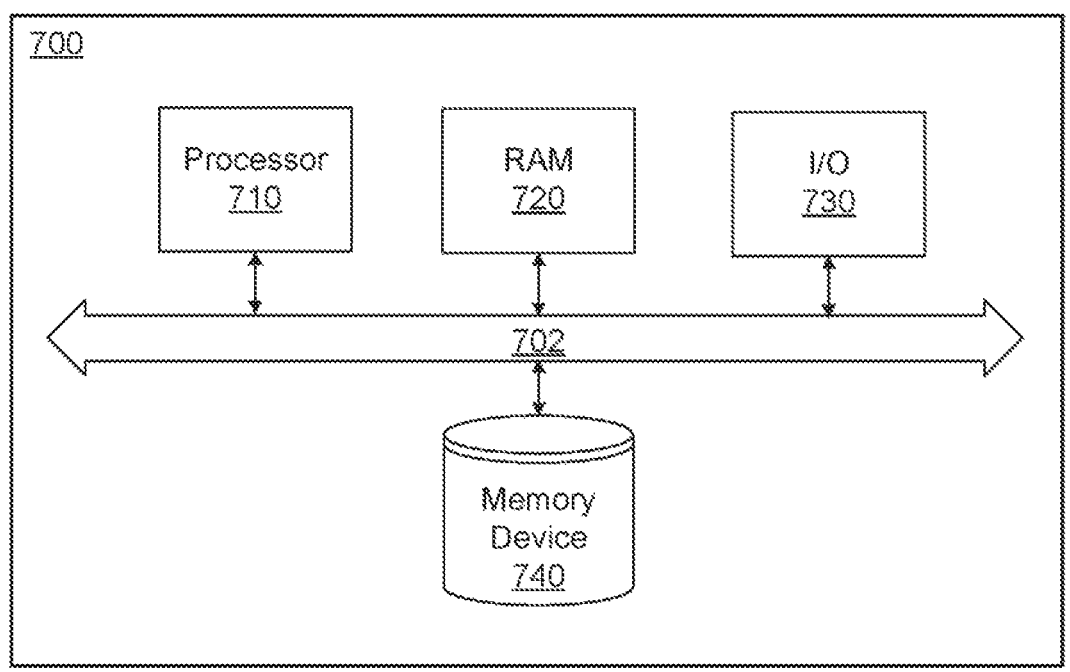
FIG. 7 is a schematic block diagram that provides one example illustration of a computing device employed in the garbage removal environment of FIG. 1 according to various embodiments of the present disclosure.

With reference to FIG. 7, shown is a schematic block diagram of a computing device 700 according to an embodiment of the present disclosure. The computing environment 103, docking station 109, robotic garbage unit 112, and client devices 118 can include one or more computing devices 700. Each computing device 700 includes at least one processor circuit, for example, having a processor 710 and a memory 720/740, both of which are coupled to a local interface 702. To this end, each computing device 700 may comprise, for example, at least one server computer or like device. The local interface 702 may comprise, for example, a data bus with an accompanying address/control bus or other bus structure as can be appreciated.

Stored in the memory 720/740 are both data and several components that are executable by the processor 710. In particular, stored in the memory 720/740 and executable by the processor 710 are the management application 130, the garbage application 169, and the client application 172, and potentially other applications. Also stored in the memory 720/740 may be a data store 127 and other data. In addition, an operating system may be stored in the memory 720/740 and executable by the processor 710.

It is understood that there may be other applications that are stored in the memory 720/740 and are executable by the processor 710 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 720/740 and are executable by the processor 710. In this respect, the term "executable" means a program file that is in a form that can ultimately be run by the processor 710. Examples of executable programs may be, for example, a compiled program that can be translated into machine code in a format that can be loaded into a random access portion of the memory 720/740 and run by the processor 710, source code that may be expressed in proper format such as object code that is capable of being loaded into a random access portion of the memory 720/740 and executed by the processor 710, or source code that may be interpreted by another executable program to generate instructions in a random access portion of the memory 720/740 to be executed by the processor 710, etc. An executable program may be stored in any portion or component of the memory 720/740 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 720/740 is defined herein as including both volatile and nonvolatile memory and data storage components. In some embodiments, the memory 720 is a volatile storage while memory 740 is a nonvolatile storage. Volatile components are those that do not retain data values upon loss of power. Nonvolatile components are those that retain data upon a loss of power. Thus, the memory 720/740 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 710 may represent multiple processors 710 and/or multiple processor cores and the memory 720/740 may represent multiple memories 720/740 that operate in parallel processing circuits, respectively. In such a case, the local interface 702 may be an appropriate network that facilitates communication between any two of the multiple processors 710, between any processor 710 and any of the memories 720/740, or between any two of the memories 720/740, etc. The local interface 702 may comprise additional systems designed to coordinate this communication, including, for example, performing load balancing. The processor 710 may be of electrical or of some other available construction.

Although the management application 130, the garbage application 169, and the client application 172, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 710 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the management application 130, the garbage application 169, and the client application 172, that comprises software or code can be embodied in any non-transitory computer-readable medium for use by or in connection with an instruction execution system such as, for example, a processor 710 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the management application 130, the garbage application 169, and the client application 172, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 103, docking station 109, robotic garbage unit 112, and/or client devices 118. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An apparatus comprising:
a robotic drive system configured to attach to a garbage container via a restrictive clamp, the restrictive clamp comprising a spring mechanism to force contact with the garbage container;
at least one computing device configured to at least:
determine a travel path for the robotic drive system to travel to a first location designated for garbage pickup comprising a curb;
identify a ledge of the curb at the first location via at least one sensor; and
cause the robotic drive system to move to be proximate to the first location without driving off an edge of the curb.

2. The apparatus of claim 1, further comprising:
at least one proximity detection sensor configured to sense a distance and a direction of objects within a proximity of the robotic drive system; and
at least one positioning sensor configured to determine a position of the robotic drive system.

3. The apparatus of claim 1, wherein the at least one computing device is further configured to at least:
cause a first signal to be transmitted to open a garage door; and
cause a second signal to be transmitted to close the garage door.

4. The apparatus of claim 1, wherein the at least one computing device is further configured to at least:
determine a second location of a docking station;
determine a second travel path for the robotic drive system to travel to the second location; and
cause the robotic drive system to move to be proximate to the second location.

5. The apparatus of claim 4, wherein the at least one computing device is further configured to at least cause the robotic drive system to electrically couple with the docking station.

6. A system comprising:
a robotic drive system configured to attach to a garbage container via a restrictive clamp, the restrictive clamp comprising a spring mechanism to force contact with the garbage container; and
at least one computing device communicably connected to the robotic drive system, the at least one computing device being configured to at least:
cause the robotic drive system to transport a garbage container to be proximate to a first location, the first location being designated for garbage pickup comprising a curb;
determine a second location of a docking station; and
cause the robotic drive system to move to be proximate to the second location without driving off an edge of the curb.

7. The system of claim 6, wherein the at least one computing system is further configured to at least cause the robotic drive system to electrically couple with the docking station.

8. The system of claim 6, wherein the at least one computing device is further configured to at least determine a travel path for the robotic drive system to travel to the first location, wherein the robotic drive system travels the travel path to be proximate to the first location.

9. The system of claim 6, wherein the at least one computing device is further configured to at least cause the robotic drive system to stay proximate to the first location for a programmable length of time.

10. The system of claim 6, wherein the at least one computing device is further configured to at least:
    determine a day of the week and a time;
    cause the robotic drive system to move to the garbage pickup location at the time on the day of the week;
    cause the robotic drive system to stay at the garbage pickup location for a predetermined length of time;
    determine that the predetermined length of time has expired; and
    in response to expiration of the predetermined length of time, cause the robotic drive system to move to the second location.

11. The system of claim 6, wherein the at least one computing device is further configured to:
    determine a geographic positioning of the robotic drive system;
    determine a first distance from the garbage pickup location to the robotic drive system;
    determine a second distance from the docking location to the robotic drive system; and
    send a command that causes the robotic drive system to begin travelling to either the garbage pickup location or the docking location based on the first distance and the second distance.

12. The system of claim 6, wherein the at least one computing device is further configured to:
    detect, via a proximity sensor, an obstruction along a travel path of the robotic drive system; and
    modify the travel path to avoid the obstruction.

13. The system of claim 6, wherein the at least one computing device is further configured to:
    determine that an unobstructed travel path to the first location is unavailable; and
    disable operation of the robotic drive system.

14. The system of claim 6, wherein the at least one computing device is further configured to at least determine a travel path for the robotic drive system to travel to the second location.

15. A method, comprising:
    detecting, via at least one computing device, a specified time on a specified day of the week associated with a garbage pickup event;
    identifying, via at least one computing device, a first location of a robotic drive system;
    identifying, via at least one computing device, a second location comprising a curb;
    generating, via at least one computing device, a travel path to travel from the first location to the second location;
    in response to detecting the specified time on the specified day of the week, coupling the robotic drive system a garbage container via a restrictive clamp, the restrictive clamp comprising a spring mechanism to force contact with the garbage container;
    transporting, via the robotic drive system, the garbage container along the travel path;
    identifying, via at least one computing device, a ledge of the curb at the second location via at least one sensor; and
    transporting, via the robotic drive system, to be proximate to the first location without driving off an edge of the curb.

16. The method of claim 15, further comprising determining, via at least one computing device, that the robotic drive system is proximate to the second location, wherein the second location is a robotic docking station.

17. The method of claim 16, further comprising initiating a docking sequence to electrically couple the robotic drive system with the robotic docking station.

18. The method of claim 17, wherein the docking sequence comprises:
    positioning the robotic drive system on a docking side of the docking station;
    aligning a coupling connector of the robotic drive system with a docking port of the docking station;
    moving, via the robotic drive system, the coupling connector in a direction of the docking port; and
    connecting the coupling connector with the docking port.

19. The method of claim 15, further comprising:
    detecting, via a proximity sensor, an obstruction along the travel path; and
    adjusting, via the robotic drive system, the travel path to avoid the obstruction based at least in part on a plurality of measurements from the proximity sensor while traveling to avoid the obstruction.

20. The method of claim 15, further comprising:
    determining that a second specified time on the specified day of the week is scheduled within a period of a week;
    undocking the robotic drive system from the robotic docking station;
    generating a second travel path from the second location to the first location; and
    transporting a garbage container attached to the robotic drive system to the first location along the second travel path.

* * * * *